Patented May 30, 1950

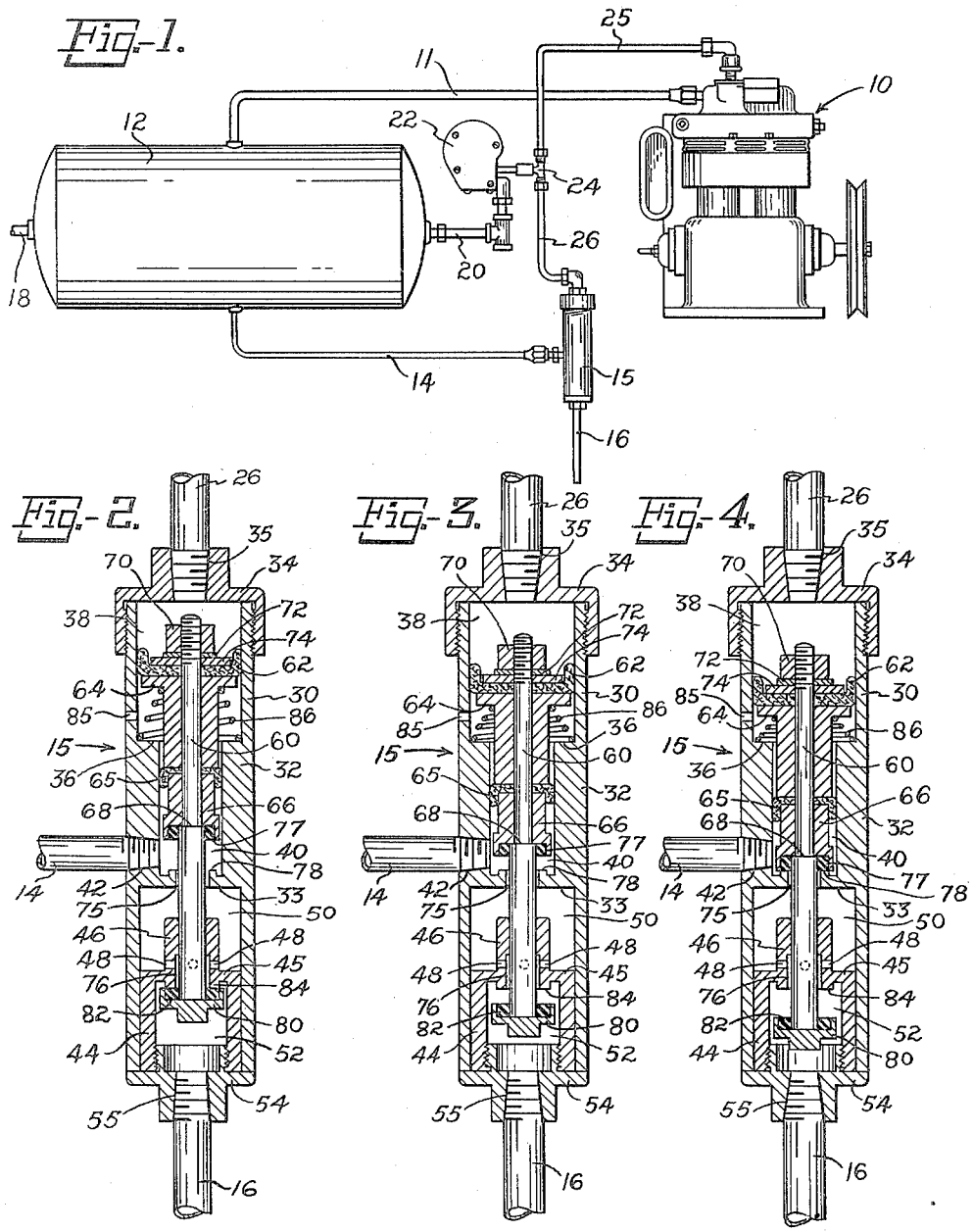

2,509,879

UNITED STATES PATENT OFFICE 2,509,879

AIR PRESSURE MECHANISM

Robert L. Pelton, Dayton, Ohio

Application November 28, 1945, Serial No. 631,275

2 Claims. (Cl. 303—88)

This invention relates to drainage means for compressed air systems such as are used for the operation of the brakes and doors of automotive buses, trolleys and the like.

In the operation of compressed air systems of this type it is commonly found that water, oil and other foreign matter tends to collect in the bottom of the compressed air reservoir, particularly during the operation of the compressor pump. This accumulated liquid matter is composed partly of condensed moisture initially taken in with the air by the compressor as well as leakage of oil and the like in the system. Unless it is removed from the reservoir it tends to be transmitted throughout the remainder of the system and may seriously interfere with the operation thereof, as by freezing in cold weather or otherwise impeding proper operation. The present invention is concerned with the maintaining of such systems free and clear of this foreign matter and has special application to the problem as it arises in the operation of automotive buses, trolley cars, trucks and similar vehicles.

One of the objects of the invention is to provide in an air pressure system a drainage device which will be inexpensive and simple to manufacture and install, which will operate automatically and intermittently to discharge water and other undesired liquid material which accumulates in the air reservoir of such systems, and which will result in minimum loss of pressure in the system both during the discharge operation and by leakage at other times while in use.

Another object is to provide a drainage device of this character which has a single connection to the air reservoir providing a pressure connection for actuation of the drainage valve and also serving as the passage through which the drainage from the pressure reservoir takes place.

It is also an object to provide such a device in which a collection chamber is provided in the discharge device itself in which the foreign matter may collect and from which it is intermittently discharged in spurts with a minimum loss of air pressure.

Other objects and advantages of the invention will be apparent from the following description, the accompanying drawings and the appended claims.

In the drawings, which illustrate a preferred embodiment of the invention and in which like reference characters designate like parts throughout:

Fig. 1 is a diagrammatic view illustrating certain parts of an air pressure system incorporating a drainage device embodying the invention; and Figs. 2, 3 and 4 are enlarged views in vertical section illustrating the construction of the drainage device shown in Fig. 1 and the relative positions of the parts thereof at different stages in its operation.

Referring to the drawings, the compressor indicated generally at 10 operates to supply air under pressure through pipe 11 to reservoir tank 12. A pipe 14 leads from the bottom of tank 12 to drainage valve 15, which is shown as provided with a drain pipe 16. Pipe 18 leads from tank 12 to mechanism such as the doors and brakes of a bus operated by air pressure from tank 12, and a pipe 20 leads from tank 12 to a governor indicated generally at 22, which is in turn connected through T-joint 24 and pipes 25 and 26 back to compressor 10 and to the top of valve device 15. This governor 22 operates to maintain the pressure within tank 12 within a predetermined range. When through the operation of compressor 10 the pressure within tank 12 has been built up to the desired level, governor 22 operates to open a connection from the tank 12, supplying pressure back through pipe 25 to the valve chamber of compressor 10. While the pistons continue to operate the valves become inoperative and thus the compressor becomes ineffective. At the same time the governor provides an open connection between tank 12 and the top of valve device 15 through pipe 26. When the pressure within the tank falls below the desired level, governor 22 reverses its previous action and closes the connection from tank 12 to the compressor and to valve device 15. When this happens, the pressure is removed from the valve chamber the valves become operative and the compressor again operates to supply air through pipe 11 to tank 12 until the pressure within the tank has again been built up to the desired level, this cycle being then repeated. With the exception of valve device 15, these parts and their operation are conventional and well understood by those skilled in the art, and no further showing thereof is believed necessary.

The construction and operation of valve device 15 are illustrated in enlarged detail in Figs. 2 to 4. The main valve body is shown as a cylindrical casing 30 provided internally with a portion of reduced diameter 32 and an annular flange 33 shown as formed integrally with cylinder 30. Closure means for the upper end of cylinder 30 is shown as comprising a flanged collar 34 threaded to the upper end of the cylinder and tapped or otherwise fitted at 35 for engagement with pipe 26. Collar 34 and the annular upper end 36 of cylinder portion 32 together define a chamber 38, and flange 33 similarly defines the lower end of a chamber 40 positioned below chamber 38. This chamber 40 may be considered as the inlet chamber of the device, and it is provided with an opening 42 which is tapped or otherwise fitted for connection to pipe 14 from the bottom of air reservoir 12.

The lower end of cylinder 30 is provided with a fitting 44, which may be press fit or otherwise secured in position, and which as shown includes a portion 46 of reduced diameter connected to the larger portion 44 by an annular portion 45. Radially arranged holes 48 provide communication between the outside of fitting portion 46 and the inner bore of the fitting. This construction provides two more vertically aligned chambers within the cylinder, a chamber 50 positioned adjacent inlet chamber 40, and an outer chamber 52 which is adapted for direct connection to the atmosphere. A closure element 54 for this lower end of the chamber is shown as connected by threaded engagement within fitting 44 and tapped at 55 for engagement with drain pipe 16.

A rod 60 is reciprocable within cylinder 30. At its upper end it carries a piston reciprocable within chamber 38 shown as comprising cup leather 62 and flanged piston member 64. A second cup leather piston member 65 is mounted for reciprocation within chamber 40 and is held between the adjacent ends of piston member 64 and poppet valve member 66 seated against an annular shoulder 68 on rod 60 provided by reducing the diameter of the upper portion of the rod with respect to the lower portion thereof. A nut 70 and washers 72 and 74 complete this assembly and hold all of these members in their desired positions on rod 60.

The lower end of rod 60 has a sliding fit within fitting portion 46, but the inner diameters of annular fitting portion 45 and annular flange 33 are slightly greater than the diameter of the lower rod portion and thereby provide an annular space 75 which provides communication between chambers 40 and 50, and an annular space 76 which provides communication from chamber 50 through holes 48 to chamber 52. Valve member 66 is provided with an annular gasket 77 of rubber or like material adapted for seating engagement with flange 33 to close annular space 75, and it will be noted that flange 33 is provided with an annular shoulder 78 having a slightly smaller outer diameter than gasket 77 to insure tight seating engagement between these members. The lower end of rod 60 carries a poppet valve member 80 provided with a similar gasket 82 adapted for seating engagement with the similar annular shoulder 84 on annular fitting portion 45. For example, very satisfactory results in operation have been obtained with a construction wherein the diameter of the lower portion of rod 60 is $\frac{5}{16}''$ and the inner diameters of annular flange 33 and annular fitting portion 45 are each $\frac{3}{8}''$.

Fig. 2 illustrates the relative positions of the parts of valve device 15 when the compressor is supplying air to the air reservoir. During this operation there is no pressure in upper cylinder chamber 38, and the open connection at 42 from reservoir 12 to chamber 40 will provide pressure air which operates on piston member 65 to move rod 60 to the limit of its upward movement. In this position valve 80 and gasket 82 are seated against the valve seat provided by annular fitting portions 45 and shoulder 84 to seal chamber 52 from the outside atmosphere. However, annular opening 75 will be open and any water tending to accumulate in tank 12 will drain down through pipe 14 to chamber 40 and thence through opening 75 into collection chamber 50.

When the pressure in tank 12 reaches the desired level and governor 22 operates as described, it will supply the tank pressure through pipe 26 into chamber 38 at the top of cylinder 30, and since the latter and piston member 62 are of greater diameter than chamber 40 and piston member 65, rod 60 will then be moved to its limit of downward movement shown in Fig. 4. However, during this movement and since valve members 66 and 80 are spaced apart on rod 60 to a distance substantially greater than the distance between the valve seats provided by flange 33 and annular fitting portion 45, there will be a moment when neither valve is in seated position as illustrated in Fig. 3. During this moment it will be seen that there is open connection between tank 12 through opening 42 into chamber 40, thence through annular space 75 into chamber 50 and from chamber 50 through holes 48 and annular space 76 into exhaust chamber 52 and the outside atmosphere. The result will be that the pressure from tank 12 will operate during this instant to expel or scavenge from the valve device water or other liquid which has collected in chamber 50 while the parts are in the relative positions shown in Fig. 2.

This moment of discharge will be of relatively quite short duration and when the rod reaches its limit of downward movement shown in Fig. 4, valve 66 and gasket 77 will seat against flange 33 and shoulder 78 to seal the connection 75 between chambers 40 and 50. Chamber 38 is provided with a vent 85 to prevent the air in the lower portion of chamber 38 from binding the operation of the device during this step. It will also be noted that if any liquid collected in chamber 50 was not expelled therefrom during the instant of open connection to the tank it can drain free while the parts are in the position shown in Fig. 4.

When the pressure in tank 12 has again been built up to the desired level and governor 22 reverses its previous action as described, the pressure supplied to chamber 38 will be cut off. Since piston member 65 and valve member 66 are so spaced on rod 60 that opening 42 is positioned between them when the valve is in the closed position shown in Fig. 4, the pressure from tank 12 entering chamber 40 through opening 42 will act against piston member 65 to reverse the previous action within the valve device and to return rod 60 to its position shown in Fig. 2. During this movement there will again be a moment when the parts are in the relative position shown in Fig. 3, with the result that there will again be a spurt of liquid blown from the valve by the open connection to the atmosphere. A coil spring 86 is shown as positioned in chamber 38 between piston member 64 and annular member 36. Such a spring of a degree of tension substantially balancing the weight of rod 60 and the parts carried thereby has been found satisfactory from the standpoint of imparting general smoothness to the operation of the device and particularly to facilitate the upward movement of the rod just described.

The above cycle of operation will be repeated intermittently whenever the pressure in tank 12 fluctuates, and this happens relatively constantly during the operation of trolleys, buses and similar conveyances in which air pressure systems of the type shown in Fig. 1 are commonly employed. Furthermore, it should be noted that the more rapid accumulation of liquid in tank 12 is during the operation of supplying air thereto, and it is during this stage of the operation that there is open connection between collection chamber 50 and the tank as shown in Fig. 2.

The device thus affords numerous advantages in use. It is simple to manufacture and install and is free from requirements of close tolerances in manufacture. It utilizes only a single connection 14 to tank 12 which serves both for drainage of the tank and for the application of pressure to piston member 65, as described. It affords a collection chamber of substantial size for the liquid which would otherwise accumulate in tank 12 and thereby minimizes the danger of freezing if no provision were made for collection of water except in the drain pipe from the tank. It provides for free drainage from the collection chamber even when the connection to the tank is closed as shown in Fig. 4. It should also be noted that the illustrated embodiment of the invention may equally well be provided with a connection between chamber 88 and the circuit to the door or brake operating mechanism in place of the illustrated connection through governor 22 to the air tank. With such connection the parts would be shifted from the positions shown in Fig. 2 to the positions shown in Fig. 4 whenever air pressure is supplied to the brakes and doors for operating purposes, and this action would be reversed whenever the pressure is cut off. With any of these connections the loss of air pressure through the valve is very slight since the connection between the tank and the atmosphere is open for only an instant at a time and is also of very small effective area. Thus the draining operation produces very little decrease in the pressure within the reservoir, which is highly advantageous, particularly with reservoirs of relatively small capacity such as are commonly used in air pressure systems for vehicles, in that it does not materially add to the load on the compressor. It should also be noted that the device does not necessarily have to be positioned in use below the level of the bottom of tank 12 as shown in Fig. 1. Tests show that the device operates with full effectiveness when mounted above tank 12 so that drainage is against the force of gravity and is effectuated by the intermittent passage of air through the drainage pipe.

While the apparatus herein described constitutes a preferred embodiment of the invention, it is to be understood that the invention is not limited to this precise apparatus, and that changes may be made therein without departing from the scope of the invention which is defined in the appended claims.

What is claimed is:

1. A drainage device for use in an air pressure system of the character described including an air reservoir, comprising a casing including an inlet chamber and a pressure chamber, means in said casing defining a collection chamber having an inlet passage from said inlet chamber and an outlet passage, a rod extending through said chambers for reciprocation in said casing, valves carried by said rod for alternately opening and closing said inlet and outlet passages, means for connecting said inlet chamber to said reservoir to provide for continuous drainage from said reservoir to said inlet chamber, means forming a first piston of predetermined effective area secured to said rod between said inlet chamber and said pressure chamber and responsive to the pressure within said inlet chamber for maintaining said rod and valves in respective positions opening one of said inlet and outlet passages and closing the other said passage, and means forming a second piston secured to said rod in said pressure chamber, said second piston being of greater effective area than said first piston to provide for moving said rod against the action of said first piston to cause said valves to close said open passage and to open said closed passage when said pressure chamber is connected with the line pressure in said system, said valves being secured to said rod in spaced relation such that both said valves are prevented from being in closed position at the same time to provide open communication between said inlet chamber and said outlet passage while said rod is in motion with respect to said casing.

2. A drainage device for use in an air pressure system of the character described including an air reservoir, comprising a casing, means in said casing defining an inlet chamber and a collection chamber having an inlet passage from said inlet chamber and an outlet passage, a rod extending through said chamber for reciprocation therein, a valve secured to said rod in position to close said outlet passage when said rod is at its limit of movement in one direction, a second valve secured to said rod in position to close said inlet passage when said rod is at its limit of movement from said first-named position, means for connecting said inlet chamber to said reservoir to provide for continuous drainage from said reservoir to said inlet chamber, a piston secured to said rod for reciprocation within said inlet chamber and responsive to the pressure in said inlet chamber to move said rod to a position wherein said valves close one of said inlet and outlet passages and open the other said passage, said casing having therein a pressure chamber adapted for connection with said air pressure system, and a pressure responsive member in said pressure chamber of greater effective area than said pressure responsive means for moving said rod against the action of said pressure responsive means to cause said valves to close said open passage and to open said closed passage, said valves being secured to said rod in spaced relation such that both said valves are prevented from being in closed position at the same time to provide open communication between said inlet chamber and said outlet passage while said rod is in an intermediate position.

ROBERT L. PELTON.

REFERENCES CITED

The following references are of record in the file of this patent:

UNITED STATES PATENTS

| Number | Name | Date |
| --- | --- | --- |
| 261,605 | Hill | July 25, 1882 |
| 410,181 | Ongley | Sept. 3, 1889 |
| 443,789 | Ongley | Dec. 30, 1890 |
| 1,278,118 | Demarest | Sept. 10, 1918 |
| 1,581,546 | Ranson | Apr. 20, 1926 |
| 1,680,288 | Gottschalk | Aug. 14, 1928 |
| 2,007,358 | Anger | July 9, 1935 |
| 2,128,206 | Hewitt | Aug. 23, 1938 |
| 2,256,565 | Mantle | Sept. 23, 1941 |
| 2,345,380 | Kirk | Mar. 28, 1944 |